(12) United States Patent
Walraevens et al.

(10) Patent No.: US 7,326,660 B2
(45) Date of Patent: Feb. 5, 2008

(54) DEGRADABLE NETTING

(75) Inventors: Aster Walraevens, Wijmaal (BE); Gaston De Greef, Aarschot (BE); Ludo Dewaelheyns, Zutendaal (BE); Keith E. Misukanis, Eagan, MN (US)

(73) Assignee: Conwed Plastics LLC, Minneapolis, MN (US)

( * ) Notice: Subject to any disclaimer, the term of this patent is extended or adjusted under 35 U.S.C. 154(b) by 0 days.

(21) Appl. No.: 11/093,433

(22) Filed: Mar. 29, 2005

(65) Prior Publication Data

US 2005/0217173 A1    Oct. 6, 2005

Related U.S. Application Data

(60) Provisional application No. 60/559,553, filed on Apr. 5, 2004.

(51) Int. Cl.
*D04H 1/00* (2006.01)
*A01G 13/02* (2006.01)

(52) U.S. Cl. ............... 442/2; 442/38; 442/43; 442/44; 442/46; 442/49; 442/50; 442/58; 47/31; 47/74; 47/78; 523/124; 523/125; 523/126; 523/128

(58) Field of Classification Search ............ 442/1, 442/2, 38, 43, 44, 46, 49, 50, 58; 47/31, 47/74, 78; 523/124, 125, 126, 128
See application file for complete search history.

(56) References Cited

U.S. PATENT DOCUMENTS

| 2,919,467 | A |   | 1/1960  | Mercer |
|-----------|---|---|---------|--------|
| 3,700,521 | A |   | 10/1972 | Gaffney |
| 3,723,218 | A |   | 3/1973  | Gaffney |
| 3,767,353 | A |   | 10/1973 | Gaffney |
| 4,123,491 | A |   | 10/1978 | Larsen |
| 4,152,479 | A |   | 5/1979  | Larsen |
| 4,190,692 | A |   | 2/1980  | Larsen |
| 4,542,199 | A |   | 9/1985  | Kaminsky et al. |
| 5,338,822 | A |   | 8/1994  | Gruber et al. |
| 5,444,113 | A | * | 8/1995  | Sinclair et al. ............ 524/306 |
| 5,539,124 | A |   | 7/1996  | Etherton et al. |
| 5,565,503 | A | * | 10/1996 | Garcia et al. ............ 523/124 |
| 5,637,660 | A |   | 6/1997  | Nagy et al. |
| 5,756,611 | A |   | 5/1998  | Etherton et al. |
| 5,854,304 | A |   | 12/1998 | Garcia et al. |
| 6,034,027 | A |   | 3/2000  | Krishnamurti et al. |
| 6,482,872 | B2| * | 11/2002 | Downie ............ 523/124 |
| 2002/0028857 | A1| * | 3/2002 | Holy ............ 523/124 |

* cited by examiner

*Primary Examiner*—Ula C Ruddock
(74) *Attorney, Agent, or Firm*—Brooks Kushman P.C.

(57) ABSTRACT

The present invention provides a degradable extruded netting. The netting comprises a plurality of interconnected strands with at least some of the strands comprising a degradable composition comprising a polyolefin, a metal carboxylate, and an aliphatic poly hydroxy-carboxyl acid. In at least one embodiment, at least 10% of the strands are made of the degradable composition. The present invention also relates to a method for making degradable extruded netting. The method comprises extruding strands of polymeric material to form a netting wherein at least some of the strands are formed of the degradable composition.

25 Claims, 1 Drawing Sheet

DEGRADABLE NETTING

CROSS-REFERENCE TO RELATED APPLICATIONS

This application claims the benefit of U.S. provisional application Ser. No. 60/559,553 filed Apr. 5, 2004.

BACKGROUND OF THE INVENTION

1. Field of the Invention

The present invention relates to degradable netting, composites made with the degradable netting, and methods for making the same.

2. Background Art

The continuous extrusion of plastic netting started in the 1950's with the process described in U.S. Pat. No. 2,919,467 to Mercer. Extruded netting is netting in which the strands are extruded from a die, the joints being formed either within the die or immediately outside the die. A variety of configurations are known, such as square, diamond, twill, etc. Some of the more common materials used to prepare extruded netting are polypropylene, polyethylene (including very low, low, medium, high, linear grades, and ethylene copolymers), nylon, polybutylene, and blends thereof.

Currently, the extrusion process of choice for manufacturing plastic nets is one in which individual plastic strands are extruded in an interconnecting network to provide the net-like structure. Methods for practicing this technique are well known. For instance, U.S. Pat. No. 3,700,521; U.S. Pat. No. 3,767,353; U.S. Pat. No. 3,723,218; U.S. Pat. No. 4,123,491; U.S. Pat. No. 4,152,479 and U.S. Pat. No. 4,190,692 show apparatus and method for making nets by the continuous extrusion of individual plastic strands. The disclosures of the above-mentioned issued patents are incorporated by reference into the present application.

These nets have found a number of uses in commerce. For example, these nets have found use as agricultural netting, such as turf netting, turf wrap, hay bail wrap, erosion control netting, packaging netting, such as for onion and turkey bags, and netting for industrial, filtration and home furnishings applications.

Turf netting and turf wrap are examples of common applications for extruded nettings. Turf netting is durable mesh netting that is laid down in fields just prior to or after seeding to facilitate grass root consolidation. The netting allows the grass seedlings to germinate and grow while the roots intertwine with the durable mesh netting resulting in a uniformly strong structure. Because of the stronger root system, growers are allowed to harvest earlier with generally thinner slabs maximizing land utilization. Turf wrap is applied during harvest to reinforce large rolls of turf. The rolls of turf are wrapped to protect the turf during installation, to minimize turf loss, and to maintain roll quality. Wrapping rolls of turf also reduces loss during transportation and helps to protect against the weather. Turf wrap can remain on the rolls or be removed during installation based upon the customer's needs.

Netting has also found use in certain composites. In such composites the netting is laminated to one or more fabric overlays. Chief among such uses and composites are fabrics for disposable diapers, incontinent briefs, training pants, bandages, dressings, diaper holders and liners and feminine hygiene garments, medical gowns, medical drapes, mattress pads, blankets, sheets, clothing, consumer wipes and other like products, such as building and construction composites.

Since netting materials often find their way into the environment, either through their implanting as a result of their intended use or as waste or debris, it has become desirable to provide netting which is degradable. A degradable plastic material is defined, according to ASTM D20.96, as plastic material that undergoes a significant change in its chemical structure under specific environmental conditions resulting in a loss of some properties that may vary as measured by standard test methods appropriate to the plastic and the application in a period of time that determines its classification. Degradation can take place by exposure to heat, microorganisms, moisture, oxidation, UV light, other chemical reactions, and combinations thereof. Initially, plastic will degrade into smaller molecules as its components molecular weights decrease. This results in decreased mechanical properties of the plastic materials. Such decreases include lower tensile strength and increased brittleness. Degradation tends to result in the plastic material completely being broken up into smaller plastic particles.

In addition to being degradable, the netting must be extrudable. In certain, more common, extruded netting manufacturing processes, plastic netting is typically extruded though an annular die and quenched in a water tank. The extrusion typically takes a tubular form. The resulting tubular netting is collapsed in a quench tank, slit, and opened up to a flat sheet. The flat sheet is then wound onto rolls. This flat sheet netting is defined as "Stage 1 netting."

To be compatible with this type of web handling system, the polymer material used in the extruded product must withstand transformation from an annular tube to a collapsed tube. The material must be flexible enough that this transition does not cause any permanent damage to the netting. The netting's folding point is particularly sensitive to damage.

After being wound, the flat sheet undergoes an orientation process where it is expanded, or stretched, in one or two directions—the machine direction and/or the cross-machine direction. The polymeric material used to form the netting must also be able to withstand this orientation process. Problems tend to occur during orientation when the polymeric materials are a blend of insufficiently homogeneous components. This can cause the netting to rip during the orientation process or result in netting that is unsatisfactorily weak. This flat sheet netting is defined as "Stage 2 netting."

Polyolefins have been found to be a suitable material for use in the extruded netting manufacturing process. However, due to the sensitivities of the process, such as those of the orientation process, the use of even small amounts of seemingly acceptable additives to the polyolefin can render the resulting composition useless.

For instance, starch/polyolefin blends that have been used to form degradable plastic products, have been found not to be compatible with the extruded netting manufacturing process. Poor dispersion of starch, coupled with the large particle-size of starch, results in excessive interference with the molecular alignment process of the polyolefin in the orientation process. This causes a weakened product, or a product break in the orientation process.

Also, the polymer blend must be capable of being processed at relatively high temperatures, such as above 275° F. (125° C.), and above 400° F. (205° C.) in the case of some polyolefins, such as polypropylene. Problems that could occur if the material cannot withstand the processing temperatures include, degradation, bubbling, void formation and chemical breakdown of material.

Furthermore, the rate of degradation of any netting must be slow enough that the netting does not degrade (either at all or too much) before it has fully served its purpose.

As such, the material used to make the netting must be able to be extrudable to form netting having desired structural properties, such as flexibility, orientability, tensile strength and degradability, and be cost effective.

SUMMARY OF THE INVENTION

The present invention provides a degradable extruded netting. The netting comprises a plurality of interconnected strands. At least some of the strands comprise a degradable composition comprising a polyolefin, a metal carboxylate, and an aliphatic polyhydroxyl carboxyl acid.

In at least one embodiment, the Stage 1 netting, (i.e., the extruded flat sheet netting before being oriented), will have a strength to weight ratio of 0.10 to 10 $lb_f/(in.\times PMSF)$, and in other embodiments between 0.75 to 1.5 $lb_f/(in.\times PMSF)$.

PMSF is pounds per 1,000 $ft^2$.

In at least one embodiment, the Stage 2 netting will have a strength-to-weight ratio of 0.5 to 20 $lb_f/(in.\times PMSF)$, in other embodiments 2 to 10 $lb_f/(in. \times PMSF)$.

Strength to weight ratio is determined by the following equation:

Strength-to-weight=(tensile strength in machine direction+tensile strength in cross-machine directions)/basis weight.

Basis weight can be determined in accordance with ASTM No. D3776.

Tensile strength of the netting is determined by the netting tensile strength tests.

The netting tensile strength test for Stage 1 netting is a modified ASTM D5035 as follows:

Cut four 1"×6" specimens in each direction (MD and CD), evenly spaced from the sample to be tested. MD means machine direction and CD means cross-machine direction. Use a constant-rate-of-extension tensile tester, such as the Instron 5500R tensile tester. The tensile tester's crosshead gap is one inch. Insert the specimen tightly into the crosshead jaws, and use a 4 in./min crosshead speed. Record the peak force observed at or before the point when the specimen breaks. Calculate the average of the result of the four tests, and normalize the average peak tensile force to tensile strength per inch by multiplying the average peak tensile force by the ratio: [exact measured or calculated number of strands in the test direction per inch]/[tested number of strands].

The netting tensile strength test for Stage 2 netting is a modified ASTM D5035 as follows:

Cut four 3"×8" specimens in each direction (MD and CD), evenly spaced from the sample to be tested. Use a constant-rate-of-extension tensile tester, such as the Instron 5500R tensile tester. The tensile tester's crosshead gap is three inches. Insert the specimen tightly into the crosshead jaws, and use a 12 in./min crosshead speed. Record the peak force observed at or before the point when the specimen breaks. Calculate the average of the result of the four tests, and normalize the average peak tensile force to tensile strength per inch by multiplying the average peak tensile force by the ratio: [exact measured or calculated number of strands in the test direction per inch]/[tested number of strands].

In at least one embodiment, at least 10% of the strands are made of the degradable composition.

In at least one embodiment, at least 50% of the strands are made of the degradable composition.

In at least another embodiment, essentially 100% of the strands are made of the degradable composition.

In at least one embodiment, the degradable composition comprises 82.5 to 99.88 wt. % of a polyolefin, 0.1 to 2.5 wt. % of a metal carboxylate and 0.02 to 1.0 wt. % of an aliphatic poly hydroxy-carboxyl acid, based on the total weight of the degradable composition.

In at least one embodiment, the degradable composition comprises 90.5 to 99.665 wt. % of a polyolefin, 0.25 to 1.5 wt. % of a metal carboxylate and 0.075 to 0.5 wt. % of an aliphatic poly hydroxy-carboxyl acid, based on the total weight of the degradable composition.

In at least one embodiment, the degradable composition comprises 96.25 to 99.425 wt. % of a polyolefin, 0.4 to 1.0 wt. % of a metal carboxylate and 0.10 to 0.25 wt. % of an aliphatic poly hydroxy-carboxyl acid, based on the total weight of the degradable composition.

In at least one embodiment, the polyolefin has a number average molecular weight (Mn) of 20,000 to 100,000, a weight average molecular weight (Mw) of 100,000 to 700,000, a PDI of 2 to 15, an MFR of 0.03 to 20 g/10 min. as measured in accordance with ASTM No. 1238, condition E or L, as appropriate, a flexural modulus of 350 to 350,000 psi as measured in accordance with ASTM No. D790, a tensile strength at yield of 0 to 6,500 psi as measured in accordance with ASTM D638, an elongation at break of 1 to 1,200% as measured in accordance with ASTM D638, a tensile strength at break of 200 to 8,000 psi as measured in accordance with ASTM D638, a hardness of 45 shore A to 110 Rockwell R as measured in accordance with ASTM D2240 (shore A); ASTM 785 (Rockwell R), a melting point of 30° C. to 175° C. as measured in DSC melting point at a rate of 10° C./min., and a density of 0.850 to 0.965 $g/cm^3$ as measured in accordance with ASTM D792.

In at least one embodiment, the polyolefin is a polypropylene having a number average molecular weight (Mn) of 20,000 to 100,000, a weight average molecular weight (Mw) of 100,000 to 700,000, a PDI of 2 to 15, an MFR of 0.1 to 20 g/10 min. as measured in accordance with ASTM No. 1238, condition L, a tensile modulus of 500 to 3,000 MPa as measured in accordance with ISO 527-2, a tensile strength at yield of 10-60 MPa as measured in accordance with ISO 527-2, an elongation at yield of 1 to 25% as measured in accordance with ISO 527-2, a flexural modulus of 500 to 3,000 MPa as measured in accordance with ISO 178, a Rockwell hardness (R-scale) of 75 to 125 as measured in accordance with ISO 2039-2, a melting point of 150° C. to 180° C. as measured in accordance with ISO 3146, and a density of 0.880 to 0.920 $g/cm^3$ as measured in accordance with ISO 1183.

In at least another embodiment, the polypropylene comprises a homopolymer.

In at least one embodiment, the metal carboxylate comprises cobalt stearate.

In at least another embodiment, the aliphatic polyhydroxy-carboxyl acid comprises citric acid.

In at least one embodiment, the degradable composition may further comprise a stabilizer to protect the netting from excessive degradation if exposed to UV light. In at least certain embodiments, the stabilizer comprises a hindered amine such as an oligomeric hindered amine light stabilizer (HALS).

In at least one embodiment, colorant and conventional additives such as fillers and processing aids can be added to the degradable composition. In this embodiment, no more than 5 wt. % of the degradable composition will comprise colorant and no more than 10 wt. % of the degradable composition will comprise conventional additives.

The present invention also relates to a method for making degradable extruded netting. The method comprises extruding strands of polymeric material to form a netting with at least a portion of the strands comprising a degradable material comprising a polyolefin, a metal carboxylate and an aliphatic poly hydroxy-carboxyl acid.

DETAILED DESCRIPTION OF THE PREFERRED EMBODIMENT(S)

Figure 1:
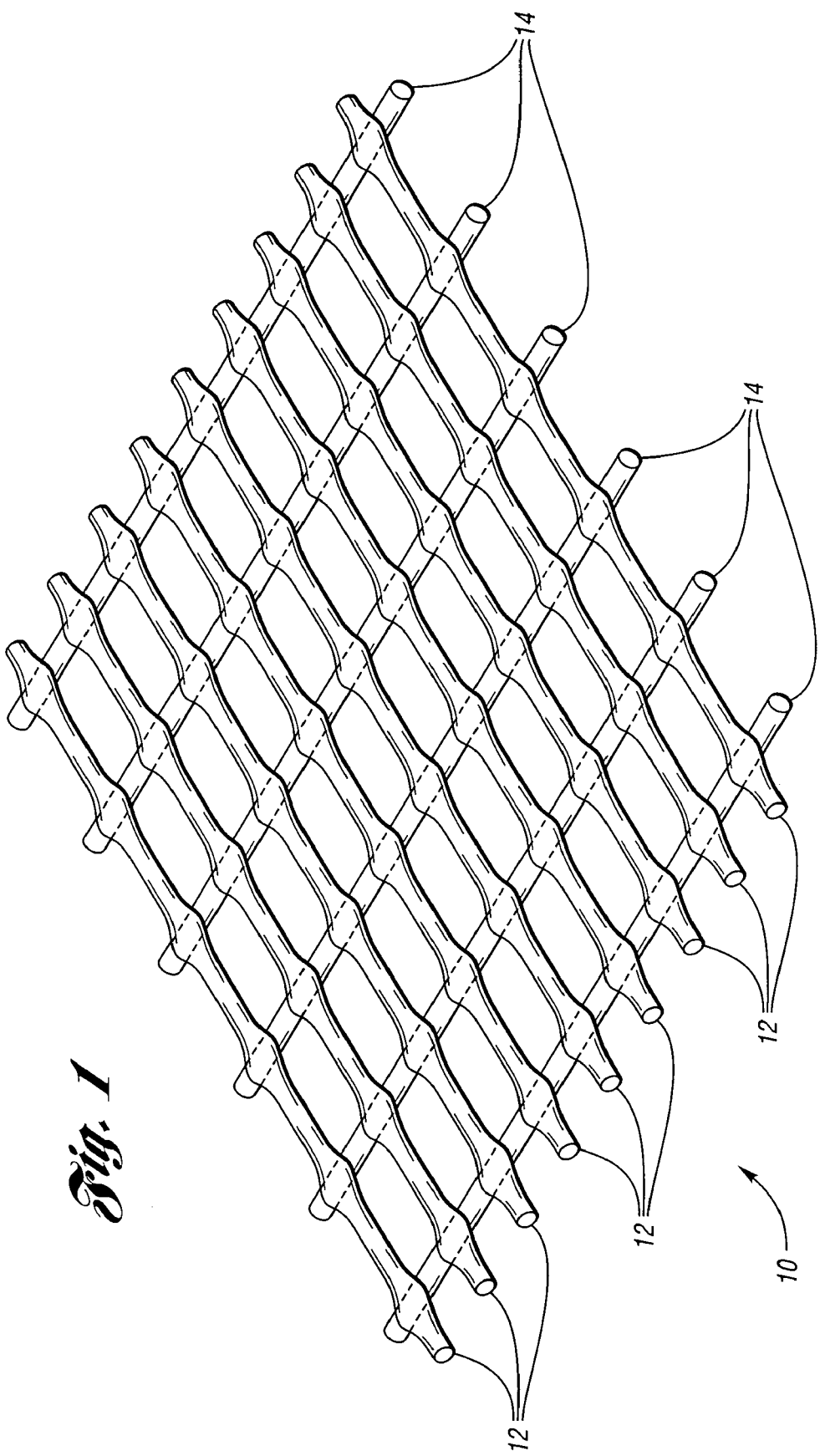
FIG. 1 is perspective view of the netting of the present invention.

Reference will now be made in detail to presently preferred compositions, embodiments and methods of the present invention, which constitute the best modes of practicing the invention presently known to the inventors. The Figure is not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

The present invention provides a netting 10 as shown in FIG. 1. The netting comprises strands 12 extending in one direction and strands 14 extending in a generally crosswise or transverse direction. The strands are extruded polymeric elongate members which cross and intersect during extrusion to form the net-like structure. In at least one embodiment, the strands 12 and 14 are made of the same material.

In at least another embodiment, strands 12 are made of a different material than strands 14. In this embodiment, the netting may comprise 10 to 90 wt. % of the material comprising strands 12 and 10 to 90 wt. % of the material comprising strands 14. In other embodiments, the netting may comprise 25 to 75 wt. % of the material comprising strands 12 and 25 to 75 wt. % of the material comprising strands 14. In other embodiments, the netting may comprise 35 to 65 wt. % of the material comprising strands 12 and 35 to 65 wt. % of the material comprising strands 14. In other embodiments, the netting may comprise 40 to 60 wt. % of the material comprising strands 12 and 40 to 60 wt. % of the material comprising strands 14. In yet other embodiments, the netting may comprise 45 to 55 wt. % of the material comprising strands 12 and 45 to 55 wt. % of the material comprising strands 14.

In embodiments where the strands 12 and 14 are made of the same material, the material comprising the strands 12 and 14 is a degradable material. When a material other then the degradable material is used to manufacture one of the sets of strands 12 or 14, such material may comprise a non-, or lesser, degradable material. Any such suitable other material could be used such as elastomeric materials such as styrenic block copolymers, Hytrel®, and Santoprene® and polyurethane, polyester, and polyamide thermoplastic elastomers. The other (i.e., non-degradable) material may also comprise non-elastomeric materials such as nylons, polyesters, polylactic acids, polypropylene, polyethylenes including HDPE and copolymers of such resins, with the polyolefins being preferred and with polypropylene being especially preferred.

In certain embodiments, the degradable composition comprises a polyolefin, a metal carboxylate and an aliphatic poly hydroxy-carboxyl acid. In other embodiments, the degradable composition may further comprise a hindered amine stabilizer. Furthermore, the degradable composition may also comprise conventional additives.

In certain embodiments, the degradable composition comprises, based on the total weight of the degradable composition:

| Components | Weight % | Weight % | Weight % | Weight % | Weight % |
|---|---|---|---|---|---|
| Polyolefin | 82.5% to 99.88% | 90.5% to 99.665% | 91% to 99.60% | 91.5% to 99.50% | 96.25% to 99.425% |
| Metal Carboxylate | 0.1% to 2.5% | 0.25% to 1.5% | 0.3% to 1.2% | 0.35% to 1.1% | 0.4% to 1.0% |
| Aliphatic Poly Hydroxycarboxyl Acid | 0.02% to 1.0% | 0.075% to 0.5% | 0.08% to 0.35% | 0.08% to 0.3% | 0.10% to 0.25% |
| Colorant | 0% to 4% | 0.01% to 2.5% | 0.01% to 2.5% | 0.01% to 2.5% | 0.075% to 1.5% |
| Conventional Additives | 0% to 10% | 0% to 5% | 0% to 5% | 0% to 5% | <1% |
| Amine Stabilizer | 0% to 1.0% | 0.01% to 0.60% | 0.05% to 0.50% | 0.05% to 0.40% | 0.10% to 0.30% |

Conventionally, a polyolefin is a homopolymer or copolymer of α-olefins or of diolefins, such as, for example, ethylene, propylene, 1-butene, 1-octene and butadiene. By way of examples, mention may be made of:

ethylene homopolymers and copolymers, particularly LDPE, HDPE, LLDPE, VLDPE and MDPE;

propylene homopolymers or copolymers;

ethylene/α-olefin copolymers, such as ethylene/propylene, EPR (ethylene-propylene rubber) and ethylene/propylene/diene (EPDM) copolymers; and copolymers of ethylene with at least one product chosen from unsaturated carboxylic acid esters or salts, such as alkyl (meth)acrylate (for example methyl acrylate), or vinyl esters of saturated carboxylic acids, such as vinyl acetate, the proportion of comonomer possibly being up to 40% by weight.

Particularly, suitable polyolefins include polypropylene, polyethylene, and mixtures thereof.

As is well known by those of ordinary skill in the art, polyolefins can be produced with Ziegler catalysts or single-site catalysts. Single-site catalysts can be divided into metallocene and non-metallocene. Metallocene single-site catalysts are transition metal compounds that contain cyclopentadienyl (Cp) or Cp derivative ligands (see U.S. Pat. No. 4,542,199). Non-metallocene single-site catalysts are referred to as those that contain ligands other than Cp but have catalytic characteristics similar to those of metallocenes. The non-metallocene single-site catalysts often contain heteroatomic ligands, e.g., boraaryl (see U.S. Pat. No. 6,034,027), pyrrolyl (see U.S. Pat. No. 5,539,124), azaborolinyl (see U.S. Pat. No. 5,756,611) and quinolinyl (see U.S. Pat. No. 5,637,660). It should be understood that the patents mentioned above are hereby incorporated herein by reference. Single-site catalysts give polyolefins narrow molecular distributions.

Suitable polypropylene includes propylene homopolymers and random copolymers with ethylene or other α-olefins. Propylene homopolymers can be isotactic, syndiotactic, or atactic, or mixtures thereof. It should be understood that when polypropylene copolymers are present, the polypropylene copolymer resins will have propylene as the major constituent. It should also be understood that as used herein, the term polypropylene refers to both homopolymers and copolymers of propylene.

Suitable random polypropylene copolymers include propylene-ethylene copolymers and propylene-$C_4$ to $C_{10}$ α-olefin copolymers. Examples of $C_4$ to $C_{10}$ α-olefins include 1-butene, 1-hexene and 1-octene. In at least one embodiment, suitable random copolymers include propylene-ethylene copolymers. If present, the propylene-ethylene copolymers preferably contain 1 to 30 wt. % recurring units of ethylene, in other embodiments 1-20 wt. % recurring units of ethylene, and in still yet other embodiments 1 to 10 wt. % recurring units of ethylene.

It is desirable to provide the polyolefin with desired molecular weight, PDI, MFR, tensile modulus, tensile strength at yield, elongation at yield, flexural modulus, Rockwell hardness, melting point, and density ranges. It should be appreciated that each of these, and other, properties can be adjusted for a given application.

In at least one embodiment, the polyolefin has a number average molecular weight (Mn) of between 20,000 and 100,000. In other embodiments, the number average molecular weight is between 40,000 and 80,000, and in yet other embodiments between 60,000 and 65,000. The measurement of number average molecular weight is preferably accomplished by GPC using polystyrene standards as described, for example, in U.S. Pat. No. 5,338,822.

In at least one embodiment, the polyolefin has a weight average molecular weight (Mw) of between 100,000 and 700,000. In other embodiments, the weight average molecular weight is between 300,000 and 550,000, and in yet other embodiments between 400,000 and 460,000. The measurement of weight average molecular weight is preferably accomplished by GPC using polystyrene standards as described, for example, in U.S. Pat. No. 5,338,822.

The polydispersity index (PDI) of the polyolefin is generally a function of branching or crosslinking and is a measure of the breadth of the molecular weight distribution. In certain embodiments the PDI. (Mw/Mn) of the polyolefin is between 2 and 25, in other embodiments between 3 and 20, and in yet other embodiments between 6 and 9. Of course, increased bridging or crosslinking may increase the PDI.

Furthermore, the melt flow rate (MFR) of the polyolefin can be measured using standard ASTM No. 1238, condition E or L testing procedures, as appropriate. In certain embodiments the polyolefin has a MFR between 0.03 and 20 g/10 min., in other embodiments, between 0.3 and 10 g/10 min., and in yet other embodiments between 1.25 and 5 g/10 min.

In at least one embodiment, the polyolefin has a tensile strength at break of between 200 and 8,000 psi. In other embodiments, the tensile strength at break is between 1,000 and 6,000 psi, and in yet other embodiments between 2,500 and 5,000 psi. The measurement of tensile strength at break is preferably accomplished by ASTM D638.

In at least one embodiment, the polyolefin has a tensile strength at yield of less than 6,501 psi. In other embodiments, the tensile strength is between 1,000 and. 6,000 psi, and in yet other embodiments between 3,000 and 5,500 psi. The measurement of tensile strength at yield is preferably accomplished by ASTM D638.

In at least one embodiment, the polyolefin has an elongation at break of 1 to 1,200%. In other embodiments, the elongation at break is between 5 to 1,000%, and in yet other embodiments between 25 and 800%. The measurement of elongation at yield is preferably accomplished by ASTM D638.

In at least one embodiment, the polyolefin has a flexural modulus of between 350 to 350,000 psi. In other embodiments, the flexural modulus is between 10,000 and 250,000 psi, and in yet other embodiments between 50,000 and 200,000 psi. The measurement of flexural modulus is preferably accomplished by ASTM D790.

In at least one embodiment, the polyolefin has a hardness of between 45 shore A to 110 Rockwell R. In other embodiments, the hardness is between 20 shore D to 100 Rockwell R, and in yet other embodiments between 70 Shore D to 90 Rockwell R. The measurement of hardness is preferably accomplished by Rockwell R: ASTM 785, Shore A, D: ASTM 2240.

In at least one embodiment, the polyolefin has a melting point of 30° C. to 180° C. In other embodiments, the melting point is between 70° C. and 170° C., and in yet other embodiments, between 100° C. and 165° C. In at least one embodiment, the polyolefin is a high melting point polyolefin. The measurement of melting point is preferably accomplished by DSC melting peak at a rate of 10° C./min.

In at least one embodiment, the polyolefin has a density of between 0.850 to 0.965 g/cm$^3$. In other embodiments, the density is between 0.890 to 0.940 g/cm$^3$, and in yet other embodiments between 0.905 to 0.925 g/cm$^3$. In some embodiments, the polyolefin may have density of 0.9 to 0.915 g/cm3. The measurement of density is preferably accomplished by ASTM D792.

It should be understood that densities of polyolefin can be affected by its processing, such as by blowing. It should also be understood that the density of the composition could be affected by the addition of fillers. When referring to density, the density is based on the polymer only (prior to the addition of fillers or blowing agents).

When polypropylene is employed, in at least one embodiment, the polypropylene has a number average molecular weight (Mn) of between 20,000 and 100,000. In other embodiments, the number average molecular weight is between 40,000 and 80,000, and in yet other embodiments between 60,000 and 65,000. The measurement of number average molecular weight is preferably accomplished by GPC using polystyrene standards as described, for example, in U.S. Pat. No. 5,338,822.

When polypropylene is employed, in at least one embodiment, the polypropylene has a weight average molecular weight (Mw) of between 100,000 and 700,000. In other embodiments, the weight average molecular weight is between 300,000 and 550,000, and in yet other embodiments between 400,000 and 460,000. The measurement of weight average molecular weight is preferably accomplished by GPC using polystyrene standards as described, for example, in U.S. Pat. No. 5,338,822.

When polypropylene is employed, the polydispersity index (PDI) of the polypropylene is generally a function of branching or crosslinking and is a measure of the breadth of the molecular weight distribution. In certain embodiments the PDI (Mw/Mn) of the polypropylene is between 2 and 25, in other embodiments between 3 and 20, and in yet other embodiments between 6 and 9. Of course, increased bridging or crosslinking may increase the PDI.

When polypropylene is employed, furthermore, the melt flow rate (MFR) of the polypropylene can be measured using standard ASTM No. 1238, condition L testing procedures. In certain embodiments the polypropylene has a MFR between 0.1 and 20 g/10 min., in other embodiments, between 0.5 and 10 g/10 min., and in yet other embodiments between 1.25 and 5 g/10 min.

When polypropylene is employed, in at least one embodiment, the polypropylene has a tensile modulus of between 500 and 3,000 MPa. In other embodiments, the tensile modulus is between 750 and 2,000 MPa, and in yet other embodiments between 1,000 and 1,500 MPa. The measurement of tensile modulus is preferably accomplished by a tensile test in accordance with ISO 527-2.

When polypropylene is employed, in at least one embodiment, the polypropylene has a tensile strength at yield of between 10 and 60 MPa. In other embodiments, the tensile strength is between 15 and 50 MPa, and in yet other embodiments between 30 and 40 MPa. The measurement of tensile strength at yield is preferably accomplished by ISO 527-2.

When polypropylene is employed, in at least one embodiment, the polypropylene has an elongation at yield at 1 to 25%. In other embodiments, the elongation at yield is between 2.5 to 17.5%, and in yet other embodiments between 7.5 and 12.5%. The measurement of elongation at yield is preferably accomplished by ISO 527-2.

When polypropylene is employed, in at least one embodiment, the polypropylene has a flexural modulus of between 500 to 3,000 MPa. In other embodiments, the flexural modulus is between 750 and 2,000 MPa, and in yet other embodiments between 1,000 and 1,500 MPa. The measurement of flexural modulus is preferably accomplished by ISO 178.

When polypropylene is employed, in at least one embodiment, the polypropylene has a Rockwell hardness (R-scale) of between 75 to 125. In other embodiments, the. Rockwell hardness is between 80 to 1.05, and in yet other embodiments between 85 and 95. The measurement of Rockwell hardness is preferably accomplished by ISO 2039-2.

When polypropylene is employed, in at least one embodiment, the polypropylene has a melting point of 150° C. to 180° C. In other embodiments, the melting point is between 155° C. and 175° C., and in yet other embodiments, between 160° C. and 170° C. The measurement of melting point is preferably accomplished by ISO 3146.

When polypropylene is employed, in at least one embodiment, the polypropylene has a density of between 0.890 to 0.920 g/cm$^2$. In other embodiments, the density is between 0.900 to 0.915 g/cm$^2$, and in yet other embodiments between 0.905 to 0.910 g/cm$^2$. The measurement of density is preferably accomplished by ISO 1183.

Suitable polypropylenes include, but not necessarily limited to Atofina Polypropylene PPH 3060 from Atofina S. A. of Brussels, Belgium and Basell Pro-fax PH229 from Basell USA Inc. of Maryland. In at least one embodiment, suitable polyolefin materials may have the following characteristics:

| Characteristic | Measurement Technique |
| --- | --- |
| Avg. Mn = 60,000-74,000 | GPC using PS standard |
| Avg. Mw = 300,000-460,000 | GPC using PS standard |
| PDI = Mw/Mn = 6.4-7.5 | |
| Melt flow rate = 1.4-1.9 g/10 min. | ISO 1133 |
| Tensile Modulus = 1,400 MPa. | ISO 527-2 |
| Tensile strength at yield = 35 MPa. | ISO 527-2 |
| Elongation at yield = 10%-11%. | ISO 527-2 |
| Flexural Modulus = 1,300-1420 MPa. | ISO 178 |
| Rockwell Hardness (R-scale) = 90-93. | ISO 2039-2 |
| Melting Point = 165° C.-175° C. | ISO 3146 |
| Density = 0.90-0.905 g/cm$^2$. | ISO 1183 |

Polyethylene resins useful for the present invention, in at least one embodiment, include homopolymers of ethylene and copolymers of ethylene with other olefinic hydrocarbon monomers such as propylene, 1-butene, 1-hexene, 4-methylpentene-1 and diolefins (e.g., 1,3-butadiene, 1,4-hexadiene, 1,5-hexadiene). It should be understood that when polyethylene copolymers are present, the polyethylene copolymer resins will have ethylene as the major constituent. It should also be understood that as used herein, the term polyethylene refers to both homopolymers and copolymers of ethylene.

In at least one embodiment, when polyethylene is present in the polyolefin composition, polyethylene homopolymers and copolymers of ethylene with $C_3$ to $C_8$ α-olefins are most advantageously employed.

In at least one embodiment, densities of the polyethylene resins can range from 0.850 to 0.965 g/cm$^3$. This range of densities typically encompasses what are referred to as low density, medium density and high density resins. In certain embodiments, high density polyethylene (HDPE), medium density polyethylene (MDPE), low density (LDPE), and very low density polyethylene (VLDPE) resins typically having densities from 0.941 to 0.965 g/cm$^3$, 0.926 to 0.940 g/cm$^3$, 0.900 to 0.925 g/cm$^3$, and 0.850 to 0.899 g/cm$^3$, respectively, are particularly advantageous. In certain embodiments, linear low density polyethylene (LLDPE) and linear medium density polyethylene (LMDPE) resins typically have densities from 0.918 to 0.925 g/cm$^3$ and 0.926 to 0.940 g/cm$^3$, respectively. In certain other embodiments, polyethylene homopolymers of moderate molecular weight distribution having densities from 0.875 to 0.925 g/cm$^3$ are especially useful.

The preferred metal carboxylates are cobalt, cerium and iron stearate. Other suitable metal carboxylates are carboxylates containing aluminum, antimony, barium, bismuth, cadmium, chromium, copper, gallium, lanthanum, lead, lithium, magnesium, mercury, molybdenum, nickel, potassium, rare earths, silver, sodium, strontium, tin, tungsten, vanadium, yttrium, zinc or zirconium. In at least one embodiment, the metal carboxylate is present in the degradable composition in an amount greater than 0.01 wt. %.

An aliphatic poly hydroxy-carboxyl acid is defined for the purpose of this invention as an aliphatic acid having either more than one hydroxy (—OH) or more than one carboxyl (—COOH) group in the organic acid. The aliphatic poly hydroxy-carboxyl acids are illustrated by the aliphatic, dihydroxy, monocarboxyl acids, such as glyoxylic acid and glyceric acid; the aliphatic, polyhydroxy, monocarboxyl acids, such as erythric acid, arabic acid or mannitic acid; the aliphatic, monohydric, dicarboxyl acids, such as tartronic acid or malic acid; the aliphatic, dihyroxy, dicarboxyl acids, such as tartaric acid; the aliphatic, polyhydroxy, dicarboxyl acids, such as trihydroxyglutaric acid and succharic acid; and the aliphatic, monohydroxy, tricarboxyl acids, such as citric acid. In at least one embodiment, the aliphatic poly hydroxy-carboxyl acid is present in the degradable composition in an amount greater than 0.01 wt. %.

Since the metal carboxylate and aliphatic poly hydroxyl-carboxyl acid could have a propensity to absorb water, the components can be treated to prevent water absorption. These materials can be coated with a barrier such as glycerol monostearate, glycerol tristearate, or pentaerythritol tetrustearate.

The metal carboxylate and aliphatic poly hydroxy-carboxyl acid can be blended with the polyolefin as separate components or as a combined component. In either case, i.e., as separate components or a combined component, the metal carboxylate and the aliphatic poly hydroxy-carboxyl acid can be supplied to the polyolefin in a carrier. Such carriers are preferably low melting, low density polyolefins, and are more preferably polyethylene. Suitable carriers for the metal carboxylate and acid are disclosed in U.S. Pat. No. 5,854,304, which is hereby incorporated by reference. Furthermore, processes for employing the carboxylate and acid in carriers are set forth in U.S. Pat. No. 5,854,304.

In at least one relatively preferred embodiment, the metal carboxylate and the aliphatic poly hydroxy-carboxyl acid are sup pied as a single component. Suitable examples of single components containing these materials are TDPA® (Totally Degradable Polymer Additive), available from EPI of Conroe, Tex. and Envirocare AG 1000 C, available from Ciba Speciality Chemicals of Great Britain.

In at least one embodiment, colorant is provided. One suitable colorant includes the green colorant 29025 GN PE Masterbatch, available from PolyOne Corporation of Assesse, Belgium, which is a green colorant in a carrier to impart green color to the resulting extruded netting which can help control the degradation rate.

In at least one embodiment, colorant is added in an amount of 0.001 to 4 wt. % (solids), in other embodiments from 0.01 to 2.5 wt. %, and in yet other embodiment from 0.75 to 1.5 wt. %, based on the total weight of the degradable composition. The colorant is capable of controlling the degradation rate since it can diminish the intensity of the UV rays. Other additives could be used which can help diminish the intensity of the UV rays, such as additives that reflect, diffuse, absorb, or defract the UV rays.

In at least one embodiment, the degradable composition may further comprise a stabilizer to protect the netting from excessive degradation from exposure to UV light. In at least certain embodiments, the stabilizer comprises a hindered amine compound, such as an oligomeric hindered amine light stabilizer or HALS. In this embodiment, the amine compound is present in the degradable composition in an amount of less than 2.5 wt. %, and in other embodiments from 0.01 to 1.0 wt. %, and in yet other embodiments from 0.05 to 0.3 wt. %, based on the total weight of the degradable composition. In at least one relatively preferred embodiment, the hindered amine stabilizer comprises Tinuvin® 783, available from Ciba.

In at least one embodiment, a degradable composition is provided that limits the method of degradation to heat degradation. In other words, in this embodiment, the degradable composition does not degrade from exposure to UV light. To prevent degradation from exposure to UV light, the colorant that is added to the degradable composition of this embodiment is titanium dioxide. In this embodiment, the titanium dioxide is present in the degradable composition in an amount of 0.001 to 4 wt. %, and in other embodiments from 0.01 to 2.5 wt. %, and in yet other embodiments from 0.1 to 0.5 wt. %, based on the total weight of the degradable composition. In another embodiment, the rate of degradation can be controlled by controlling the amount of titanium dioxide, or other suitable colorant, in the degradable composition such that in addition to heat degradation, UV degradation can occur at a desired level depending upon the amount of colorant in the degradable composition.

Suitable conventional additives include processing aids, fillers, such as talc, antioxidants, slip, antiblock, and oxidizers. Examples of these additives include Irganox 1076.

The degradable composition can be made by any conventional process for forming these types of compositions. These processes include, but are not necessarily limited to, compounding. Generally, suitable methods for making the composition comprise compounding, either as a separate operation using a twin-screw extruder (preferred method in at least one embodiment), or in-line compounding using a single-screw extruder equipped with a screw that features good distributive and dispersive mixing characteristics.

Since polyolefin is the primary component of the degradable. composition, the degradable composition's properties will be essentially, or even identical in some cases, to that of the polyolefin.

When the polyolefin is polyproplyene, in at least one embodiment, the degradable composition has a number average molecular weight (Mn) of between 20,000 and 100,000. In other embodiments, the number average molecular weight is between 40,000 and 80,000, and in yet other embodiments between 60,000 and 65,000. The measurement of number average molecular weight is preferably accomplished by GPC using polystyrene standards as described, for example, in U.S. Pat. No. 5,338,822.

When the polyolefin is polypropylene, in at least one embodiment, the degradable composition has a weight average molecular weight (Mw) of between 100,000 and 700,000. In other embodiments, the weight average molecular weight is between 300,000 and 550,000, and in yet other embodiments between 400,000 and 460,000. The measurement of weight average molecular weight is preferably accomplished by GPC using polystyrene standards as described, for example, in U.S. Pat. No. 5,338,822.

When the polyolefin is polypropylene, the polydispersity index (PDI) of the degradable composition is generally a function of branching or cross linking and is a measure of the breadth of the molecular weight distribution. In certain embodiments the PDI (Mw/Mn) of the degradable composition is between 2 and 25, in other embodiments between 3 and 20, and in yet other embodiments between 6 and 9. Of course, increased bridging or cross linking may increase the PDI.

When the polyolefin is polypropylene, in at least one embodiment, the melt flow rate (MFR) of the degradable composition can be measured using standard ASTM No. 1238, condition L testing procedures. In certain embodiments the degradable composition has a MFR between 0.1 and 20 g/10 min., in other embodiments, between 0.5 and 10 g/10 min., and in yet other embodiments between 1.25 and 5 g/10 min.

When the polyolefin is polypropylene, in at least one embodiment, the degradable composition has a tensile modulus of between 500 and 3,000 MPa. In other embodiments, the tensile modulus is between 750 and 2,000 MPa, and in yet other embodiments between 1,000 and 1,500 MPa. The measurement of tensile modulus is preferably accomplished by a tensile test in accordance with ISO 527-2.

When the polyolefin is polypropylene, in at least one embodiment, the degradable composition has a tensile strength at yield of between 10 and 60 MPa. In other embodiments, the tensile strength is between 15 and 50 MPa, and in yet other embodiments between 30 and 40 MPa. The measurement of tensile strength at yield is preferably accomplished by ISO 527-2.

When the polyolefin is polypropylene, in at least one embodiment, the degradable composition has an elongation at yield at 1 to 25%. In other embodiments, the elongation at yield is between 2.5 to 17.5%, and in yet other embodiments between 7.5 and 12.5%. The measurement of elongation at yield is preferably accomplished by ISO 527-2.

When the polyolefin is polypropylene, in at least one embodiment, the degradable composition has a flexural modulus of between 500 to 3,000 MPa. In other embodiments, the flexural modulus is between 750 and 2,000 MPa, and in yet other embodiments between 1,000 and 1,500 MPa. The measurement of flexural modulus is preferably accomplished by ISO 178.

When the polyolefin is polypropylene, in at least one embodiment, the degradable composition has a Rockwell hardness (R-scale) of between 75 to 125. In other embodiments, the Rockwell hardness is between 80 to 105, and in yet other embodiments between 85 and 95. The measurement of Rockwell hardness is preferably accomplished by ISO 2039-2.

When the polyolefin is polypropylene, in at least one embodiment, the degradable composition has a melting point of 150° C. to 180° C. In other embodiments, the melting point is between 155° C. and 175° C., and in yet other embodiments, between 160° C. and 170° C. The measurement of melting point is preferably accomplished by ISO 3146.

When the polyolefin is polypropylene, in at least one embodiment, the degradable composition has a density of between 0.890 to 0.920 g/cm$^2$. In other embodiments, the density is between 0.900 to 0.915 g/cm$^2$, and in yet other embodiments between 0.90 to 0.910 g/cm$^2$. The measurement of density is preferably accomplished by ISO 1183.

The extruded netting can be made by any conventional netting extrusion process. Suitable examples of these processes are set forth in the Background of the Invention, herein. Generally, suitable methods for making the netting comprises extruding the degradable composition through dies with reciprocating or rotating parts to form the netting configuration. This creates cross machine direction strands that cross the machine direction strands, which flow continuously. Of course, it should be understood that the degradable composition could be used to form both the cross machine direction strands and the machine direction strands, or one or part of the strands, in which case, another material such as another degradable composition or a non-degradable material could be used to form the other strands. After the extrusion, the netting is then typically stretched in the machine direction using a differential between two sets of nip rollers. After this, the material is then typically stretched in any suitable manner, such as that described in U.S. Pat. No. 4,152,479, which is incorporated herein by reference, in the cross direction using a tenter frame. It should be understood, that the above described method is just one of many suitable methods that can be employed to manufacture extruded netting in accordance with the present invention.

In at least one embodiment, the Stage 1 netting (i.e., the extruded flat sheet netting before being oriented) will have a strength to weight ratio of 0.1 to 10 lb$_f$/(in.×PMSF), and in other embodiments between 0.75 to 1.5 lb$_f$/(in.×PMSF).

In at least one embodiment, the Stage 2 netting will have a strength-to-weight ratio of 0.5 to 20 lb$_f$/(in.×PMSF), in other embodiments 2 to 10 lb$_f$/(in.×PMSF).

In at least one embodiment, the extruded netting has a basis weight of between 0.3 to 1000 lbs./1000 square feet, in other embodiments between 1 to 100 lbs./1000 square feet, and in yet other embodiments 10 to 50 lbs./1000 square feet, as measured in accordance with ASTM D3776.

In at least one embodiment, the extruded netting has a machine direction tensile to break strength of 0.1 to 100 lbs./strand, in other embodiments between 1 to 25 lbs./strand, and in yet other embodiments 2 to 15 lbs./strand, as measured in accordance with either of the netting tensile strength tests.

In at least one embodiment, the extruded netting has a cross direction tensile to break strength of 0.1 to 100 lbs./strand, in other embodiments between 1 to 25 lbs./strand, and in yet other embodiments 2 to 15 lbs./strand, as measured in accordance with either of the netting tensile strength tests.

In at least one embodiment, the extruded netting has a machine direction strands per inch (i.e., strand count) of 0.1 to 50 strands/inch, in other embodiments 0.5 to 25 strands per inch, and in yet other embodiments 1 to 10 strands/inch. The strand count is taken while the netting is laying flat and not under tension of compression.

In at least one embodiment, the extruded netting has a cross direction strands per inch of 0.1 to 50 strands/inch, in other embodiments 0.5 to 25 strands/inch, and in yet other embodiments 1 to 6 strands per inch.

In some embodiments, the extruded netting has strands that have an average thickness (i.e., diameter) of 1 to 300 mils, in other embodiments 10 to 50 mils, and in yet other embodiments 15 to 40 mils, as measured in accordance with ASTM 1777-64, using a one inch diameter swivel foot, with a 120 g mass, measured to the closest mil.

The extruded netting will have an ability to withstand ultraviolet degradation for at least a predetermined period of time. This can be measured by controlled environment testing. QUV test methods are used to standardize the products' environmental response.

Controlled Environment Testing

A. No UV Exposure

In at least one embodiment, the extruded netting will withstand a minimum of 500 hours of with exposure to 40° C. with no UV light energy maintaining 75% of its original strength. In another embodiment, the extruded netting will withstand a minimum of 800 hours of with exposure to 40° C. with no UV light energy maintaining 75% of its original strength. The products were tested according to ASTM D4329-92 using these mentioned deviations. The tensile testing was conducted according to the Stage 2 netting tensile strength test.

B. With UV Exposure

In at least one embodiment, the extruded netting will withstand a minimum of 100 hours of exposure to 30° C. with 66 hours of UV exposure tested according to ASTM D4329-92 maintaining 50% of its original strength. In another embodiment, the extruded netting will withstand a minimum of 200 hours of exposure to 30° C. with 133 hours of UV exposure tested according to ASTM D4329-92 maintaining 50% of its original strength.

The netting made in accordance with the present invention has many potential uses. Particularly, the properties of the netting make the netting of the invention particularly suitable for use as turf net, turf wrap, hay bale wrap, and erosion control applications. Particularly, the netting may be used to hold blankets of straw, excelsior, coconut and other adsorbent fibers together while brush is allowed to grow and prevents runoff during the early stage of growth. The netting can also be used for packaging, such as to wrap pallets.

The netting can also be used to form other types of composites wherein the netting is secured to at least one or more layers of material. Examples of such composites include consumer wipes, reinforced tissue towels, and erosion control composites.

The present invention may be further appreciated by consideration of the following, non-limiting examples, and certain benefits of the present invention may be further appreciated by the examples set forth below.

EXAMPLES

Example 1

Various extruded nettings (stage 1) are extruded at a basis weight of 120 gsm (grams/m$^2$). Various degradable compositions are used to form the nettings. The composition (wt. %) of the various nettings are set forth below in Table 1.

The extruded netting's strength to weight ratio is 0.9-1.2. The extruded netting is subsequently biaxially oriented by first stretching the extruded netting in the machine direction, then stretching immediately in the cross machine direction at temperatures between 212 to 300° F. The resulting biaxially oriented netting has 1.3 strands per inch in the MD and 0.7 strands per inch in the CD. The oriented (stage 2) netting's strength to weight ratio is 4.5-6.5.

Example 2

The nettings made of compositions A, B and C are then tested for aerobic degradation under controlled conditions at 40° C. for 1004 hours without exposure to any UV light (UVA—340 lamps) according to ASTM Test No. D4329-92.

The degradation rates of the nettings are determined in accordance with the following procedure. The net is initially tested for tensile strength in accordance with the Stage 2 netting tensile strength test, in the machine direction. The netting is then exposed to conditions that would bring on aerobic degradation in accordance with ASTM Test No. D4329-92 as set forth in Example 2. The net is then retested for tensile strength in accordance with the netting tensile strength test. The % difference in values is the % strength loss.

The results of the netting degradation are shown in Table 2 below.

TABLE 2

| Netting | % Strength Loss |
|---|---|
| A | 0% |
| B | 21% |
| C | 25% |

The results of Table 2 show that without the degradation additives and UV light, the polypropylene netting will not degrade. The results also show that greater (i.e., faster) degradation will occur with higher levels of degradation additive.

TABLE 1

| Composition | Polyolefin[1] | Cobalt Stearate | Citric Acid[2] | Amine Stabilizer[3] | Colorant[4] | Weight of netting (lbs./1000 ft$^2$) |
|---|---|---|---|---|---|---|
| A | 99% | 0 | 0 | 0 | 1% | 1.45 |
| B | 97.87% | 0.7% | 0.23% | 0 | 1.2% | 1.45 |
| C | 97.6% | 0.9% | 0.3% | 0 | 1.2% | 1.45 |
| D | 98.14% | 0.5% | 0.16% | 0 | 1.2% | 1.45 |
| E | 97.94% | 0.5% | 0.16% | 0.2% | 1.2% | 1.45 |

[1] Atofina Polypropylene PPH 3060, available from Atofina of Brussles, Belgium.
[2] The cobalt stearate and citric acid are added in one component called Envirocare AG 1000C, available from Ciba Speciality Chemicals of Great Britain. Envirocare is believed to contain 50 to 80% polyethylene, 7.5 to 22.5% cobalt stearate, and 7.5 to 22.5% citric acid.
[3] Tinuvin ® 783 available from Ciba Speciality Chemicals of Great Britain. Tinuvin 783 is a 50:50 mixture of Ciba CHIMASSORB 944 and TINUVIN 622 with the following chemical names:
CHIMASSORB 944: Poly [6-[(1,1,3,3-tetramethylbutyl)amino]-1,3,5-triazine-2,4-diyl][2,2,6,6-tetramethyl-4-piperidinyl)imino]1,6-hexanediyl[2,2,6,6-tetramethyl-4-piperidinyl (imino]]).
Tinuvin 622: Butanedioic acid, dimethylester, polymer with 4-hydroxy-2,2,6,6-tetramethyl-1-piperidine ethanol.
[4] Green colorant 29025 GNPE Masterbatch, available from PolyOne Corporation of Assesse, Belgium.

Example 3

The nettings made of compositions A, B, C and D are then tested for aerobic degradation under controlled conditions at 30° C. for 285 hours with exposure to UV light (UVA-340 lamps) for 194 hours according to ASTM Test No. D4329-92. The degradation rate is determined in the same manner as in Example 2.

The results of the netting degradation are shown in Table 3 below.

TABLE 3

| Netting | % Strength Loss |
|---|---|
| A | 11% |
| B | 50% |
| C | 40% |
| D | 50% |

The results of Table 3 shown that, under the exposure to heat and UV light, netting having the degradation additive will degrade greater (i.e., faster) than netting not having the degradation additive.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A degradable extruded netting, said netting comprising a plurality of oriented interconnected extruded strands that intersect during extrusion, at least some of the strands comprising a degradable composition comprising a polyolefin, a metal carboxylate, and an aliphatic poly hydroxy-carboxyl acid.

2. The netting of claim 1 wherein at least 50% of the strands are made of the degradable composition.

3. The netting of claim 1 wherein essentially 100% of the strands are made of the degradable composition.

4. The netting of claim 1 wherein the degradable composition comprises 96.5 to 99.85 wt. % of a polyolefin, 0.1 to 2.5 wt. % of a metal carboxylate, and 0.05 to 1.0 wt. % of an aliphatic poly hydroxy-carboxyl acid, based on the total weight of the degradable composition.

5. The netting of claim 4 wherein the polyolefin has a number average molecular weight of 20,000 to 100,000.

6. The netting of claim 1 wherein the degradable composition comprises 98.45 to 99.85 wt. % of a polyolefin, 0.1 to 1.25 wt. % of a metal carboxylate, and 0.05 to 0.3 wt. % of an aliphatic poly hydroxy-carboxyl acid, based on the total weight of the degradable composition.

7. The netting of claim 6 wherein the polyolefin has a density of 0.850 to 0.965 g/cm$^3$.

8. The netting of claim 7 wherein the polyolefin has an MFR of 0.01 to 20 g/10 mm.

9. The netting of claim 6 wherein the polyolefin comprises polypropylene.

10. The netting of claim 9 wherein the metal carboxylate comprises cobalt stearate.

11. The netting of claim 10 wherein the aliphatic poly hydroxy-carboxyl acid comprises citric acid.

12. The netting of claim 1 wherein the metal carboxylate and the aliphatic poly hydroxy-carboxyl acid are provided into the degradable composition in a solid polyolefin carrier.

13. The netting of claim 1 wherein the degradable composition further comprises hindered amine stabilizer present in an amount of less than 1 wt. %.

14. The netting of claim 1 wherein the degradable composition comprises 97.45 to 99.85 wt. % of a polyolefin, 0.1 to 1.25 wt. % of a metal carboxylate, 0.05 to 0.3 wt. % of an aliphatic poly hydroxy-carboxyl acid, and a hindered amine light stabilizer present in an amount of 0.05 to 1 wt. % based on the total weight of the degradable composition.

15. A composite, said composite comprising:
the netting of claim 1, the netting having a first side and a second side, opposite the first side; and
a first layer of material secured to the first side of the netting.

16. The composite of claim 15 further comprising a second layer of material secured to the second side of the netting.

17. The composite of claim 15 wherein each of the layers comprises a sheet.

18. The netting of claim 1 wherein the netting comprises an erosion control netting.

19. The netting of claim 1 wherein the netting comprises a hay bale wrap netting.

20. The netting of claim 1, wherein the netting has a strength-to-weight ratio 0.5 to 20 pounds-force/(inch-pounds per thousand square feet).

21. The netting of claim 20 wherein the oriented interconnected strands are biaxially oriented.

22. The netting of claim 20 wherein the netting has a machine direction tensile to break strength of 1 to 25 pounds/strand.

23. The netting of claim 22 wherein the netting has a cross direction tensile to break strength of 1 to 25 pounds/strand.

24. The netting of claim 1 wherein the netting has a stage 1 strength to weight ratio of 0.1 to 10.0 pounds-force (inch-pounds per thousand square feet).

25. The netting of claim 1, wherein the netting has a strength-to-weight ratio 2 to 10 pounds-force/(inch-pounds per thousand square feet).

* * * * *